(12) United States Patent
Williamson, Jr.

(10) Patent No.: US 7,370,709 B2
(45) Date of Patent: May 13, 2008

(54) SUBTERRANEAN MAGNETIC FIELD PROTECTIVE SHIELD

(75) Inventor: Jimmie R. Williamson, Jr., Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 232 days.

(21) Appl. No.: 10/932,956

(22) Filed: Sep. 2, 2004

(65) Prior Publication Data

US 2006/0043972 A1    Mar. 2, 2006

(51) Int. Cl.
*E21B 31/06* (2006.01)
(52) U.S. Cl. ..................... 166/386; 166/66.5
(58) Field of Classification Search ............... 166/66.5, 166/386
See application file for complete search history.

(56) References Cited

U.S. PATENT DOCUMENTS

| | | | |
|---|---|---|---|
| 3,351,133 A * | 11/1967 | Clark, Jr. et al. | ............. 166/53 |
| 3,942,373 A | 3/1976 | Rogers | |
| 3,982,058 A | 9/1976 | Hill | |
| 4,181,014 A | 1/1980 | Zuvela et al. | |
| 4,348,672 A | 9/1982 | Givler | |
| 4,625,573 A | 12/1986 | Henry | |
| 5,070,595 A * | 12/1991 | Perkins et al. | ............. 29/602.1 |
| 5,134,285 A | 7/1992 | Perry et al. | |
| 5,349,133 A | 9/1994 | Rogers | |
| 6,028,266 A | 2/2000 | Birke | |
| 6,212,928 B1 | 4/2001 | Kim et al. | |
| 6,252,159 B1 | 6/2001 | Anagnos | |
| 6,369,500 B1 | 4/2002 | Joung | |
| 6,489,772 B1 | 12/2002 | Holladay et al. | |
| 6,564,084 B2 | 5/2003 | Allred, III et al. | |
| 6,597,545 B2 | 7/2003 | Macken et al. | |
| 6,626,244 B2 | 9/2003 | Powers | |
| 6,698,516 B2 | 3/2004 | Van Steenwyk et al. | |
| 6,844,492 B1 | 1/2005 | Wang et al. | |
| 2003/0155131 A1 | 8/2003 | Vick, Jr. | |
| 2006/0247748 A1 * | 11/2006 | Wahlstrand et al. | ........ 607/116 |
| 2006/0261765 A1 * | 11/2006 | Prasanna | ................ 318/254 |

* cited by examiner

Primary Examiner—David J. Bagnell
Assistant Examiner—Nicole Coy
(74) Attorney, Agent, or Firm—Peter Schroeder

(57) ABSTRACT

Downhole mechanical or electrical equipment that possess, induce or supply large electromagnetic interference or magnetic fields are sometimes placed in subterranean wells, usually as part of or attached to wellbore tubulars. These magnetic fields can interfere with the efficient operation of some electronic, gyroscopic or magnetic well tools that pass by, through, near or adjacent to such downhole equipment. In general, a subterranean magnetic field protective shield apparatus is provided which reduces or substantially eliminates this magnetic field interference or enhances the operation of, or minimizes damage to, sensitive electronic or magnetic well tools. Such a subterranean magnetic field protective shield enhances the operation of other tools and protects other devices from adverse effects of magnetic fields stronger than the earth's magnetic field intensity.

67 Claims, 5 Drawing Sheets

SUBTERRANEAN MAGNETIC FIELD PROTECTIVE SHIELD

FIELD OF THE INVENTION

The present invention relates generally to the protection of downhole equipment utilized in conjunction with subterranean wells from magnetic or electromagnetic field interference. More particularly, the present invention provides a protective shield from the large magnetic fields possessed or induced by certain downhole equipment and the affect of this magnetic field on the operation or effectiveness of certain downhole tools.

BACKGROUND OF THE INVENTION

It is sometimes desirable to place into a subterranean wellbore, temporarily or permanently, mechanical or electrical downhole equipment which possesses, induces or provides a magnetic field with a stronger intensity than that of the earth's natural magnetic field. Examples of this equipment include, but are not limited to, MRI tools, solenoid actuators, and magnetic couplings. Magnetic couplings might be used to operate downhole safety valves, sliding sleeves, adjustable chokes, and pumps.

It is also sometimes desirable to use certain magnetic or electric downhole tools which may be affected or whose operation may be impeded by the presence of strong magnetic or electric fields. Examples of such downhole tools include but are not limited to subterranean logging devices, flow meters, formation evaluation tools, directional drilling equipment, directional or other survey instruments, coils, gyroscopic apparatus, MRI tools, photo-multipliers, casing or tubing collar locators, information gathering and/or transmitting devices and various electrical tools.

An objective of this invention is to reduce or minimize the interference of subterranean electric or magnetic fields with the efficient or effective operation of downhole tools.

SUMMARY OF THE INVENTION

In general, a device and method is provided to shield the apparatus or operation of downhole tools from magnetic fields possessed, induced or provided by equipment located in subterranean wells.

An apparatus is presented for use in a subterranean well, the apparatus including a carrier defining an interior passageway and a magnetic-field shield assembly on the carrier. The shield assembly has at least two layers of materials, at least one of the layers of a magnetic material and at least one of the layers of a non-magnetic material. The shield assembly operates to dampen a magnetic field and shield tools sensitive to such fields. The apparatus can include a magnetic-field producing device adjacent to the exterior of the carrier, such as a magnetically operated device, like a subsurface valve. The apparatus can also include a downhole tool adversely affected by a magnetic field, such as a gyroscope. The downhole tool is located in, or run through, the interior passageway of the carrier and thus protected from a magnetic field emanating from exterior the carrier. It is expected that the downhole tool will be adversely effected by the magnetic field produced by the downhole device without such shielding.

The magnetic-field shield will typically have at least one non-magnetic layer and at least one magnetic layer. One layer is preferably a high magnetic permeability layer such as a nickel-iron alloy. The downhole device and the magnetic shield assembly can be attached to one another or separate. Since the downhole device will often produce a magnetic field intensity of at least one-hundred times that of the earth's magnetic field in the well, say in a range of 0.002 to 0.010 Tesla, the magnetic field shield assembly is preferably operable to deflect such a magnetic field such that the field within the shield is less than ten times the earth's magnetic field intensity in the well. The carrier, which can be the mandrel, itself may act as one of the layers of the magnetic field shield assembly.

A method for using the apparatus is also presented.

BRIEF DESCRIPTION OF THE DRAWINGS

Drawings of the preferred embodiment of the invention are attached hereto, so that the invention may be better and more fully understood.

Figure 1:
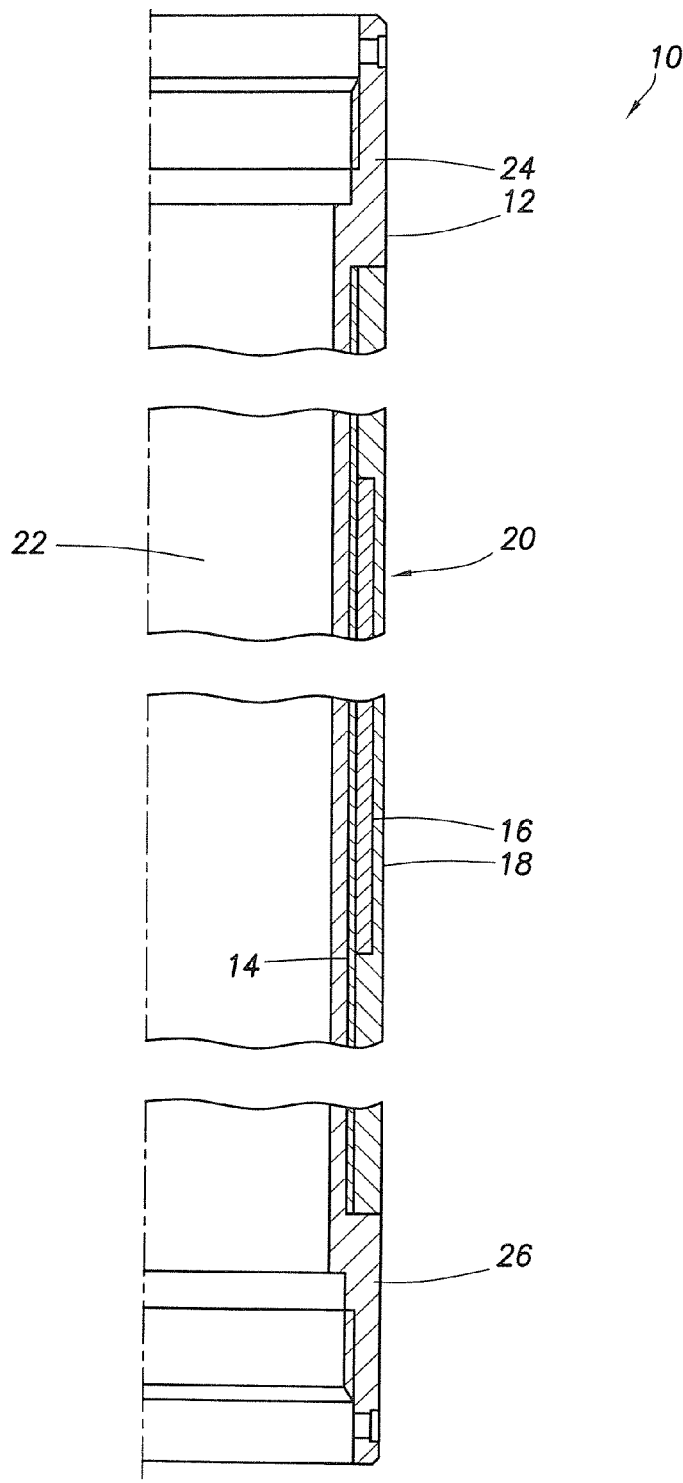
FIG. 1 is a one-quarter cross-sectional view of a subterranean magnetic field protective shield assembly in accordance with a preferred embodiment of this invention.

Numeral references are employed to designate like parts throughout the various figures of the drawing. Terms such as "left," "right," "horizontal," "vertical," "up" and "down" when used in reference to the drawings, generally refer to orientation of the parts in the illustrated embodiment and not necessarily during use. The terms used herein are meant only to refer to the relative positions and/or orientations, for convenience, and are not meant to be understood to be in any manner otherwise limiting. Further, dimensions specified herein are intended to provide examples and should not be considered limiting.

DETAILED DESCRIPTION OF THE PREFERRED EMBODIMENT OF THE INVENTION

Referring now in greater detail to FIG. 1, an exemplary subterranean magnetic field protective shield assembly 10. As shown, the assembly 10 consists of two major components: (1) the subterranean magnetic field protective shield 20 which is housed in (2) a supporting carrier or mandrel 12.

In the preferred embodiment, the assembly 10 is envisioned to be a hollow cylinder or tubular, which defines an interior space or passage 22, although other configurations are not meant to be excluded.

The shield 20 includes preferably at least two layers of materials. As illustrated, the mandrel 12 also serves as the innermost layer of the shield 20 and becomes the sole layer at both ends of the assembly 10. The mandrel 20 could be made of other materials and support the shield 20 without necessarily being part of the shield 20 itself. The mandrel 12 preferably has connectors 24 and 26 at either end such that the mandrel can be attached to a tubing string, coil tubing, a slickline or E-line retrievable locking device, or the like.

The shield 20 should consist of at least two layers and optimally four or more layers. As illustrated, the shield 20 consists of four layers of materials. The innermost layer 12

(which in this embodiment also serves as the mandrel 12) would ideally be comprised of a magnetic material which preferably would be a high coercive force material such as 1010-1020 steel. In this case, the mandrel 12 defines the passage 22 through the tubular assembly 10.

The next adjacent layer (second layer) 14 would ideally be a non-magnetic spacer layer which could be made of a non-magnetic metal or other non-magnetic materials such as PEEK®, Teflon®, carbon-carbon composite, fiber glass, or the like. It could also be made of a non-magnetic plating such as electroless nickel or chromium.

The next adjacent layer (third layer) 16 would ideally be a high magnetic permeability layer. This layer 16 should be made of a material which is magnetically soft and has a high magnetic permeability. Such high magnetic permeability materials are available under many commercially available registered trade names including, but not limited to, Co-netic AA®, Mumetal®, Hipernon®, Hy-Mu-80®, and Permalloy®. These magnetic shielding alloys are comprised of about 80% nickel and 15% iron, with the balance being copper, molybdenum or chromium, depending on the trade recipe used. Other magnetic shielding or high magnetic permeability materials could be used. The special properties of such magnetic shielding alloys make them suitable material for reducing low-frequency electromagnetic interference (EMI). Because they can absorb magnetic energy without retaining it, they are referred to as magnetically soft. This property is also called coercive force. Any material with a low coercive force should be a good magnetic shielding material for this third layer 16.

The next adjacent layer (fourth layer) 18 (in FIG. 1, the outer layer) should be another non-magnetic layer. As illustrated this layer 18 also serves as a separation and protection layer. This layer 18 is preferably made of fiber glass with the ourtermost surface hardened with ceramic beads or non-magnetic metal plating such as nickel or chromium.

The number, sequence, and thickness of the individual layers comprising the shield 20 can vary to provide differing amounts of protection or shielding from a magnetic field. Optimization in reducing the magnetic field strength can be made using calculations, magnetic FEA programs, experience and experimentation.

In practice, the designer may first establish a minimum acceptable ID which combined with the available downhole OD would limit the maximum assembly 10 thickness. Within this tolerance of total thickness, the designer could optimize the thickness and composition of each layer and the total number of layers to create the best or an acceptable magnetic shield which reduces the magnetic field shielded by the apparatus 10.

For example, a shield with a 3.00 inch minimum ID may have an inner layer 12 which is 3.260 inch OD, a non-magnetic layer 14 which is 0.06 inches thick, a high magnetic permeability layer 16 which is 0.126 inches thick and an outer protective separation non-magnetic layer 18 which is 0.074 inches thick.

Figure 2:
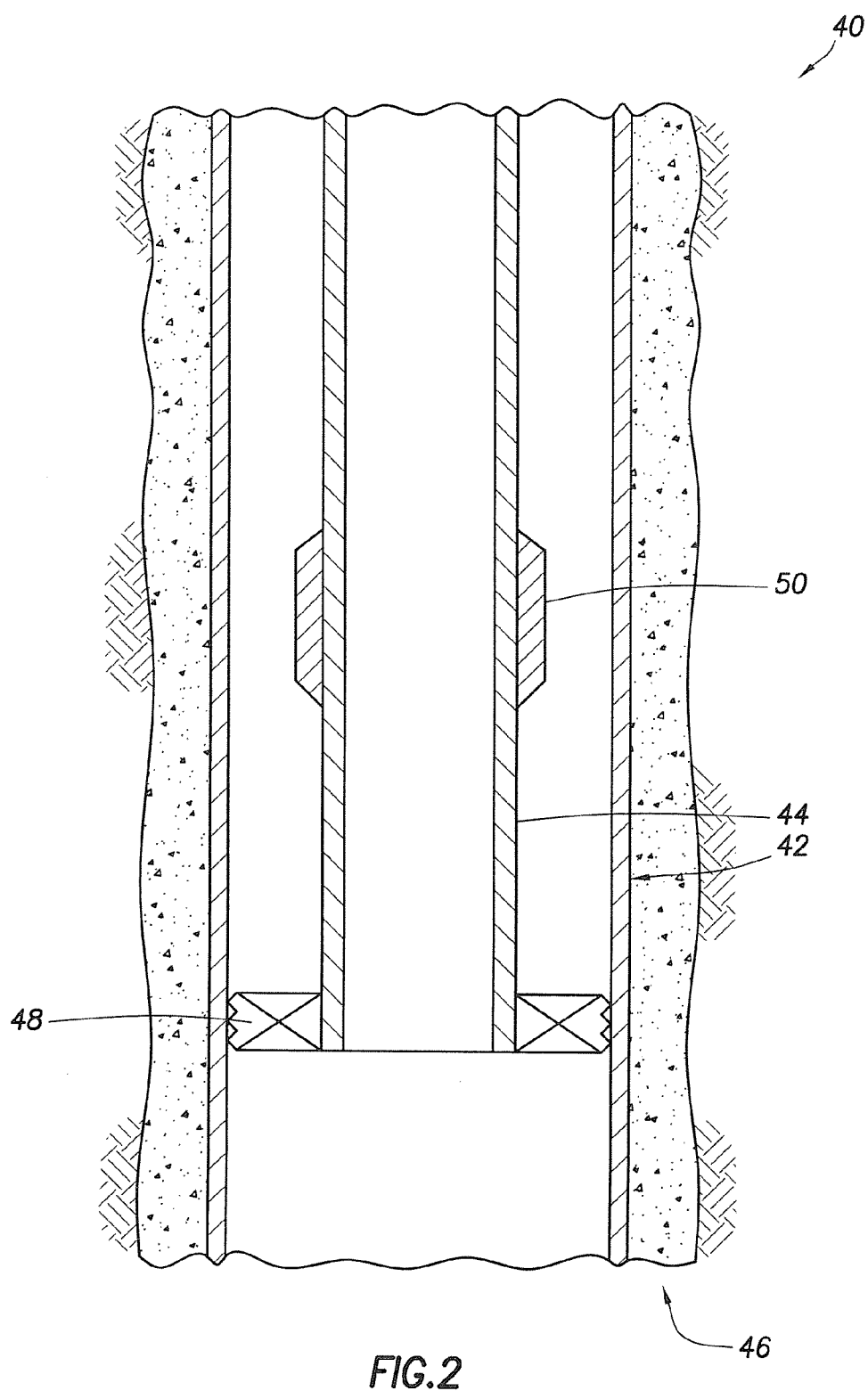
FIG. 2 is a cross-sectional schematic of a cased subterranean well with tubing and downhole equipment capable of inducing a magnetic field.

FIG. 2 shows a simplified cross-sectional schematic of a section of a subterranean well 40 in the earth or below water having its borehole walls lined with casing and containing downhole equipment 50 as part of an inner tubing string 44. The borehole is representative of any subterranean well, whether on-shore or off-shore, and regardless of inclination (straight hole, directional, deviated or horizontal). Although the outer tubular member 42 is shown as casing, the tubular member could consist of casing, tubing, drill pipe, liner, coiled tubing, or any other well tubular goods. Likewise, the inner tubing string 44 may consist of any well tubular goods.

Usually both the casing and the tubing are made of steel, but either or both could be made of other materials adequate for subterranean well use including, but not limited to, composite non-metallics, special alloys, fiber glass, resins, epoxy, vinyl esters or combinations of these or other material possibly reinforced with additional materials.

In FIG. 2, although both the casing 42 and the tubing 44 are depicted as single continuous strings of tubulars, the invention would be applicable to jointed tubulars and to other tubular configurations including, for example, concentric layers of two or more tubular strings that overlap for at least a portion of their length, or tampered tubulars having varying diameters at different depths.

The casing string is depicted as being at least partially cemented 46 into the wellbore, but such is not a requirement for the operation of the invention.

Figure 3:
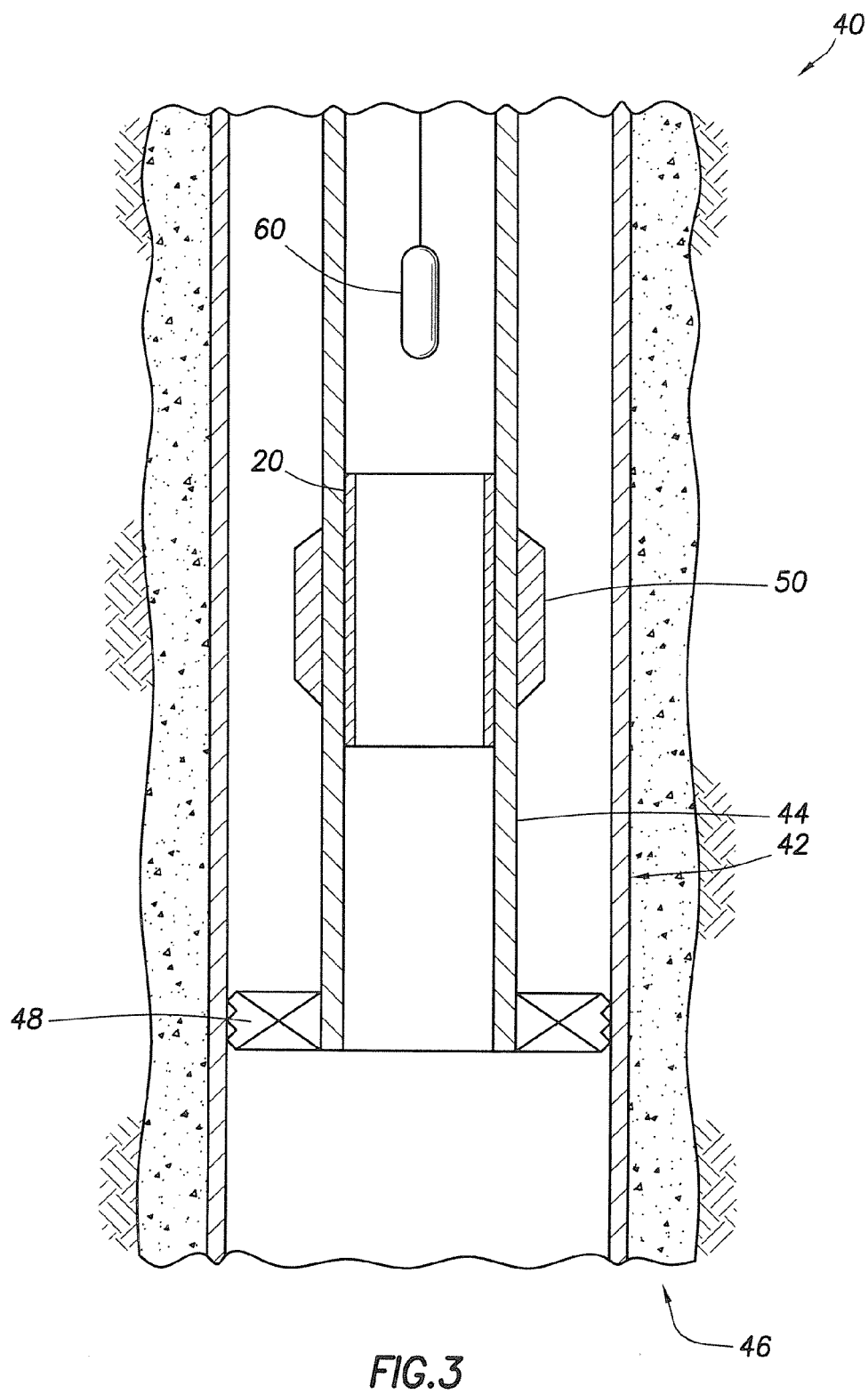
FIG. 3 is a cross-sectional view of a subterranean magnetic field protective shield placed in a well adjacent to downhole equipment.

The annulus between the tubing 44 and the casing 42 is shown in FIG. 2 and FIG. 3 as being isolated at some subterranean point with tubing packer 48. Use of such a packer 48 is not necessary for the use of this invention.

The downhole equipment 50 in FIG. 2 is meant to be representative of any individual or grouping of downhole equipment which possess, induce, or produce an electric or magnetic field. A prime example of such downhole equipment 50 would be a subsurface safety valve. The downhole equipment 50 could be any device or combination of devices that has at least sometimes an electric or magnetic field associated with it including, but not limited to, control valves, sliding sleeves, power supply equipment, actuated ports, pumps, sensors, transmitters or receivers.

The downhole equipment 50 is shown as an integral part of the tubing string 44, but it could be part of any casing or other tubular and could be attached to such tubulars by various methods including, for example, being set in a tubular nipple or collect system or hung from a permanent or retrievable packer.

FIG. 3 is a cross-sectional view of a subterranean magnetic field protective shield 20 placed in a subterranean well 40 adjacent to a downhole equipment 50 capable of developing a magnetic field or electromagnetic field. FIG. 3 is similar to FIG. 2, but additionally illustrates the shield 20 located downhole and a well tool 60 introduced inside the tubing 44.

The shield 20 is shown as covering the inside diameter of the downhole equipment 50 to interfere with any electric or magnetic field associated with such equipment 50 thus buffeting or shielding any downhole tools 60 or tools to be introduced into the tubing string 44.

The shield 20 may typically be run into the tubing using slick line or electric line or cable, but it could be moved into place many other ways including, but not by way of exclusion, being installed in place simultaneously with the downhole equipment 50, run inside tubing string 44 on a smaller diameter workstring, coiled tubing or flexible composite tubular string or pumped down with a fluid injected from the surface through the tubing and/or a flow line or being pulled into place by the gravity of the earth after being inserted into the tubing at the surface outlet. Additionally the shield 20 could be run simultaneously with the well tool 60 or tools that the shield 20 it is meant to protect from any electric or magnetic field.

The shield 20 can be permanently or temporarily held in its shielding position by becoming attached to the tubing 44 and/or the downhole equipment 50 by any means including, but not limited to, mechanical holding devices such as profiled nipples, collets, slips or latches or by use of magnetic or electric energy. Additionally, the shield could be attached to or run adjacent to the well tool 60 or tools that need to be protected.

The shield 20 could also be made of expandable material to be set adjacent to the downhole equipment 50, but capably of fitting through a smaller diameter restriction or restriction uphole from the downhole equipment 50. The shield may also be expandable for use in conjunction with expandable tubing.

In FIG. 3, the well tool 60 being introduced into the tubing 44 is shown to be run-in on an oil field wire line. It could also be inserted into the tubing 44 using various other methods including, but not limited to, being pumped down from the surface, run on drill pipe, coiled tubing, composite material string, non-electric cable, or a workstring, or pulled down by gravity.

Figure 4A:
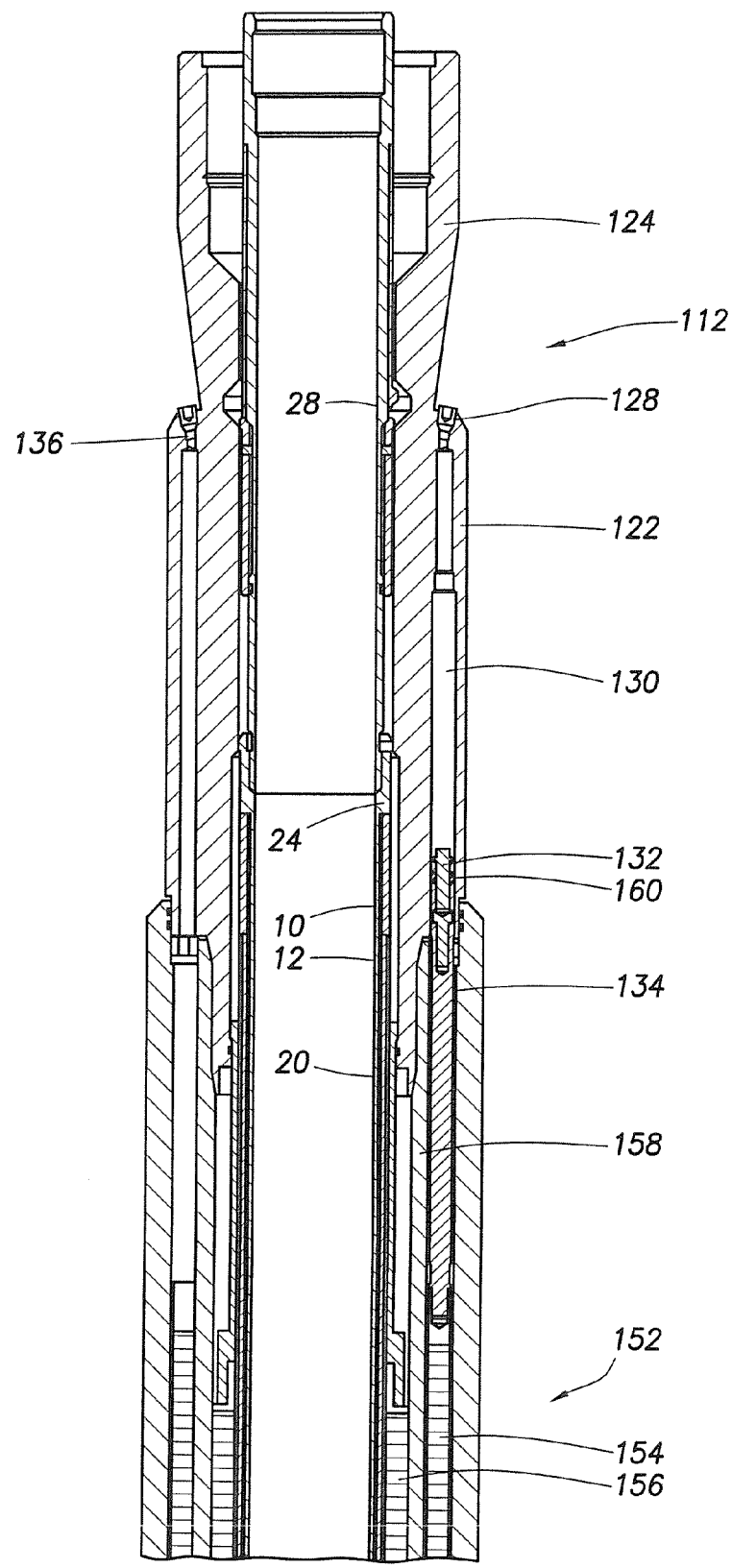
FIGS. 4A & B are cross-sectional views of a deep set safety valve assembly having a magnetic coupling and a subterranean magnetic field protective shield assembly placed in the subsurface safety valve equipment.

FIGS. 4A & B show an example of the shield assembly 10 in place in a subsurface safety valve 112. The subsurface safety valve 112 is operable using a magnetic coupling which creates or possesses a magnetic field. The valve 112 is only one example of downhole equipment 50 which creates a magnetic field and which can be used in conjunction with a shield assembly 10. A deep-set safety valve 112 is described in U.S. Patent Application Publication No. U.S. 2001/0155131 A1 in detail and is incorporated herein for all purposes.

FIGS. 4A & B depict a shield assembly 10 placed in a downhole safety valve 112. The safety valve 112 has an outer housing assembly 122 with upper and lower connectors 124, 126 for interconnecting the safety valve 112 in the tubing string. A control line port 128 is provided for connecting a control line to the safety valve 112.

When a control line is connected to the port, the control line is placed in communication with an internal chamber 130 above a rod piston 132. Although a single rod piston 132 is depicted in FIG. 4A, it should be understood that any type and any number of pistons may be used, such as multiple rod pistons, or an annular piston, etc.

The lower side of the piston 132 is in communication with another chamber 134. The chamber 134 is in communication via an opening 136 with an annulus surrounding the tubing string 144 in the well. Thus, the piston 132 is responsive to a differential between pressure in the control line and pressure in the annulus.

A spring 140 in the lower chamber 134 biases the piston 132 upwardly. When the differential between control line pressure and annulus pressure acting on the piston 132 exceeds the upwardly biasing force of the spring 140, the piston 132 displaces downwardly. When the upwardly biasing force of the spring 140 exceeds the force due to the pressure differential acting on the piston 132, the piston displaces upwardly. The spring 140 depicted is a coiled compression spring, but any type of biasing device may be used instead, or in addition.

The safety valve 112 is of the type which uses a flapper 142 to selectively open and close a flow passage 144 extending axially through the safety valve. The flapper is shown in its open position in FIG. 4B. A torsion spring 146 biases the flapper 142 to pivot to its closed position.

A spring 150 is provided to bias the opening prong 148 toward its upward position. However, since the position of the opening prong 148 is fixed to the position of the piston 132, as described in detail below, use of the spring 150 is not necessary.

Although the safety valve 112 is depicted as being a flapper-type safety valve, note that any type of safety valve may be constructed to embody principles of the invention.

For example, the safety valve 112 could instead be a ball-type safety valve, or a sleeve-type safety valve, etc.

The position of the opening prong 148 with respect to the piston 132 is fixed by means of a magnetic coupling 152. The magnetic coupling 152 includes a series of annular permanent magnets 154 attached to the opening prong 148, and a second set of annular permanent magnets 156 attached to the piston 132. Although the magnets 154 are depicted as being exposed to the inner passage 144 and the magnets 156 are depicted as being exposed to the chamber 134, the magnets may be suitably isolated with appropriate packaging in actual practice.

The magnets 154, 156 are preferably constructed and arranged so that their poles are appropriately aligned to maximize the magnetic attraction therebetween. Any number of magnets 154, 156 may be used to generate a sufficient magnetic attraction, so that, as the piston 132 and magnets 156 displace upwardly and downwardly, the magnets 154 and opening prong 148 displace therewith.

As used herein, the term "magnet" indicates those materials and devices which are used to generate a magnetic field. Magnets include materials such as permanent and temporary magnetic materials. Magnets also include devices, such as electromagnets, used to generate magnetic fields.

Instead of using two stacks of annular magnets 154, 156, the magnetic coupling 152 could include other types of magnetic devices. For example, the magnet 156 could be an electromagnet. The magnet 154 could be a ferrous material which is induced to displace in response to the magnetic field generated by the electromagnet.

Any combination of magnets and/or magnetically-reactive materials or devices may be used for each of the magnets 154, 156. Thus, any type of magnetic devices may be used in the magnetic coupling 152 in keeping with the principles of the invention.

The opening prong 148 is an example of an operating member which may be displaced to actuate a well tool, such as the safety valve 112. Other types of operating members, such as sliding sleeves, setting mandrels, etc. may be displaced by use of the magnetic coupling 152 in keeping with the principles of the invention.

Figure 4B:
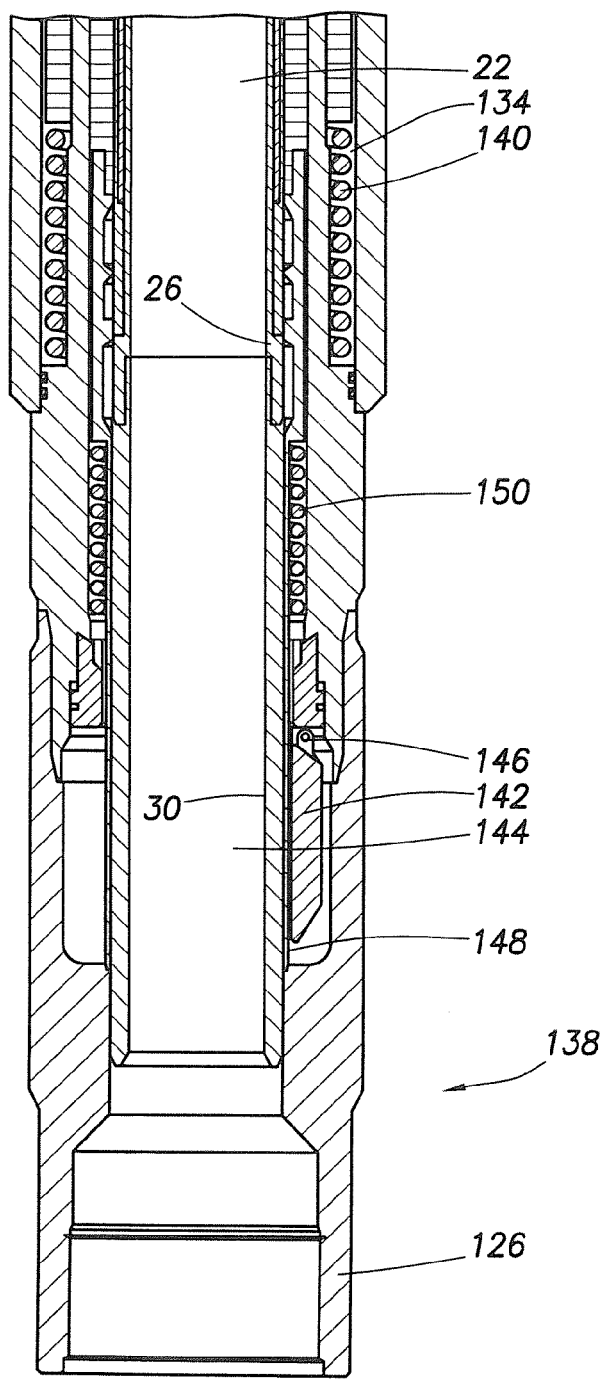

As depicted in FIGS. 4A-4B, hydraulic pressure in the control line has been increased to apply a sufficient differential pressure across the piston 132 to displace the piston downwardly against the force exerted by the spring 140. As the piston 132 displaces downward, the magnets 156 displace downward as well, causing the magnets 154 to displace downward, thereby also displacing the opening prong 148 downward and opening the flapper 142.

Furthermore, note that the opening prong 148 is pressure-balanced and is pressure isolated from the chambers 130, 134 containing the pressures used to actuate the safety valve 112. As used herein, the term "pressure balanced" is used to indicate that the fluid pressures acting on a member or assembly produces no net biasing force. Some conventional safety valves use dynamic seals to provide pressure isolation between pressure in the tubing string and, for example, pressure in the control line. However, it is well known that dynamic seals are generally more susceptible to leakage than static seals or rigid barriers, and so it is desirable to reduce or eliminate dynamic seals in a safety valve.

As used herein, the term "dynamic seal" is used to indicate seals which provide pressure isolation between members which have relative displacement therebetween, for example, a seal which seals against a displacing surface, or a seal carried on one member and sealing against the other member, etc. A dynamic seal may be elastomeric or resilient, nonelastomeric, metal, composite, rubber, or made of any other material. A dynamic seal may be attached to each of the relatively displacing members, such as a bellows or a flexible membrane. A dynamic seal may be attached to neither of the relatively displacing members, such as a floating piston.

In the safety valve 112, a rigid tubular barrier 158 separates the flow passage 144 from the chambers 130, 134. No dynamic seal is used between the opening prong 148 and the piston 132. That is, displacement of the piston 132 is translated into displacement of the opening prong 148, with no dynamic seal being used therebetween. Instead, the magnetic coupling 152 permits translation of the piston 132 displacement to the opening prong 148 across the barrier 158, with complete pressure isolation therebetween, and without any dynamic seals.

The piston 132 does include dynamic seals at 160, but the differential pressure across these seals is relatively low. The seals 160 must only seal against a pressure differential between the control line and the annulus 138. The hydrostatic pressure in the control line and in the annulus 138 will in most circumstances be approximately equal, and so only a relatively small amount of pressure will be applied to the control line to actuate the safety valve 112.

The principles of the invention may be incorporated into any type of downhole equipment 50 having a magnetic field. For example, the downhole equipment 50 can be a packer, a sliding sleeve valve, an internal control valve, choke or a perforating apparatus. However, it should be understood that these are merely given as examples, and any type of well equipment may incorporate principles of the invention.

The magnetic field protective shield is preferably designed for use in conjunction with downhole equipment 50 which has a large magnetic field. For example, a typical downhole piece of equipment may use a magnetic coupling in operation. A downhole safety valve 112 is presented herein as one example of such a piece of equipment. The magnetic coupling of such equipment can have an internal magnetic field that is on the order of approximately 0.035 Tesla. This field intensity is approximately 692 times that of the earth's magnetic field intensity. This is only an example of magnetic field intensity produced by such a downhole piece of equipment. Such downhole equipment can have magnetic field intensities ranging from about 0.10 to 0.02 Tesla. It is believed that certain downhole tools, as explained herein, would be adversely affected by such a strong magnetic field. The magnetic field protective shield is preferably designed to reduce the magnetic field intensity of the downhole equipment to about 0.00009 Tesla. Preferably, the shield reduces the magnetic field intensity of the downhole equipment to around two times the earth's magnetic field intensity. These are merely examples of the effect of the magnetic field shield presented. The shield can be designed to reduce the magnetic field intensity to approximately the range of 0.0010 to 0.00010 Tesla. Since the shield reduces the magnetic field intensity in the region inside the shield to a range only a few times that of the earth's magnetic field (0.00006 Tesla), this reduced field will not adversely affect any magnetically-sensitive tool which is operated adjacent the downhole equipment. All of the ranges given are exemplary only.

The magnetically-operated downhole equipment 50 may be used to move a portion of the equipment linearly, as in the safety valve 112, or rotationally as in a pump.

In an exemplary linear magnetic coupling, each of the outer and inner annular magnets 154 and 156 includes a stack of alternating layers of magnets and magnetically-reactive material layers. In each of the magnetic stacks, polarities of the magnets are axially aligned, but are reversed between alternating magnets in each stack, so that the same magnet polarity faces each side of each of the layers. Thus, each of the layers has induced in it a magnetic polarity opposite to that of adjacent layers in the same stack. In addition, each of the layers has induced in it a magnetic polarity opposite to that of the layer on the opposite side of the barrier 158. In this manner, the annular magnets are magnetically attracted to each other. Displacement of the annular magnets 154 will be translated into displacement of the annular magnets 156 across the non-magnetic barrier 158. Other types of magnetic couplings 152 may be used in the downhole equipment 50.

Placed adjacent the magnetically-actuated downhole equipment 50, here a safety valve 112, is magnetic field protective shield assembly 10 with protective shield 20. The shield 20 covers at least a portion of the inside diameter of the downhole valve 112 and is preferably coextensive with the length of the annular magnets 154 and 156. The shield 120 interferes with any electromagnetic or magnetic field associated with the magnetically-operated valve 112. The shield 120 acts to buffer or shield any downhole tool, such as tool 60, introduced into the central opening 22 by the shield 12. The central opening 22 allows enough room for a downhole tool 60 to pass through the shield assembly 10. The shield 112 protects any downhole tool 60 from possible negative effects of the magnetic field caused by the downhole valve 112. The mandrel 12 is connected to an upper tubular 28 and a lower tubular 30 by connectors 24 and 26, respectively. The upper end of the shield assembly has an internal fishing neck. It is run with a slickline operated GS running/puling tool. Jar down to release. On the upper end OD of the shield assembly is a no-go (enlarged OD). The no-go shoulders on the honed bore ID adjacent to the internal groove just below number 28. Above the no-go is a collet. The collet is propped by the fishneck. An interference fit is used to hold the fishneck down. When pulled, there are some shear screws (just above number 24) which shear when the fish neck is pulled up. When the reduced OD is pulled under the collets, they can retract inward so that the shield can be pulled.

The shield assembly 10 can be lowered into position adjacent the valve 112 by tubing string, coiled tubing, wire line or any other method. Preferably, the shield assembly is retrievable and can be removed separately. Alternately, the shield assembly can be made part of the magnetically-operated downhole valve 112 or equipment 50, or connected to the equipment at the surface, and lowered with the equipment.

The apparatus and methods in the embodiments shown and described above are only exemplary. Therefore, many details are neither shown nor described. Even though numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used in the attached claims. The restrictive description and drawings of the specific examples above do not point out what an infringement of this patent would be, but are to provide at least one explanation of how to make and use the inventions. The limits of the inventions and the bounds of the patent protection are measured by and defined in the following claims.

What is claimed is:

1. A magnetic-field shielding apparatus for use in a subterranean well having a wellbore extending through a subterranean formation, the wellbore containing a downhole device having an interior passageway extending therethrough, the downhole device producing a magnetic field in the interior passageway, the magnetic-field shielding apparatus comprising:
   a mandrel defining an apparatus interior passageway of a size to allow a downhole tool to pass longitudinally through the apparatus interior passageway;
   the apparatus of a size to fit into the interior passageway of the downhole device; and
   a magnetic-field shield assembly on the mandrel, the assembly having at least two radially overlapping layers of material, at least one of the layers being a magnetic material and at least one of the layers being a non-magnetic material, the shield assembly operable to dampen the magnetic field produced by the downhole device, thereby capable of shielding a downhole tool located in the apparatus interior passageway from the magnetic field.

2. An apparatus as in claim 1, further comprising means for temporarily supporting the apparatus in the wellbore.

3. An apparatus as in claim 2 wherein the downhole device and the magnetic shield assembly are attached to one another.

4. An apparatus as in claim 2 wherein the apparatus is removable from the wellbore.

5. An apparatus as in claim 1, further comprising a downhole tool adversely affected by a magnetic field, the downhole tool located in the apparatus interior passageway and protected from the magnetic field emanating from the downhole device.

6. An apparatus as in claim 5 wherein the downhole tool is temporarily located in the apparatus interior passageway.

7. An apparatus as in claim 1, further comprising a downhole tool sensitive to the magnetic field of the downhole device, the apparatus located at least partially inside the downhole device interior passageway and the downhole tool located in the apparatus interior passageway, the downhole tool protected from the magnetic field of the downhole device.

8. An apparatus as in claim 1 wherein the magnetic-field shield assembly has at least two magnetic layers and at least two non-magnetic layers.

9. An apparatus as in claim 1 wherein at least one layer is a high magnetic permeability layer.

10. An apparatus as in claim 9 wherein the high magnetic permeability layer comprises at least a nickel-iron alloy.

11. An apparatus as in claim 1, wherein the downhole device produces a magnetic field intensity of at least 0.02 Tesla.

12. An apparatus as in claim 1 wherein the downhole device produces a magnetic field intensity in the range of 0.02 to 0.10 Tesla.

13. An apparatus as in claim 12 wherein the magnetic field shield assembly, when placed inside the downhole device interior passageway, is operable to deflect the magnetic field produced by the downhole device exterior to the shield assembly, such that the magnetic field intensity inside the apparatus interior passageway is less than 0.001 Tesla.

14. An apparatus as in claim 1 wherein the downhole device comprises a magnetic-field producing assembly having a longitudinal extent, and
   the magnetic-field shield assembly having a longitudinal extent of at least the same of that of the magnetic-field producing assembly, such that the shield assembly when in place in the wellbore is at least co-extensive with the magnetic-field producing assembly.

15. An apparatus as in claim 14 wherein the extent of the shield assembly is greater than the extent of the magnetic-field producing assembly.

16. An apparatus as in claim 1 wherein the downhole device is a magnetically operated device.

17. An apparatus as in claim 1 wherein the magnetic field shield assembly, when placed inside the downhole device interior passageway, is operable to deflect the magnetic field produced by the downhole device exterior to the shield assembly, such that the magnetic field intensity inside the apparatus interior passageway is less than 0.001 Tesla.

18. An apparatus as in claim 1 wherein the magnetic field is produced intermittently.

19. An apparatus as in claim 1 wherein the shield apparatus is removable attached to the downhole device.

20. An apparatus as in claim 1 wherein the shield apparatus is retrievable independent of the downhole device.

21. A method of using an apparatus in a subterranean well having a wellbore extending through a subterranean formation, the method comprising the steps of:
   placing a downhole device into the wellbore, the downhole device defining a downhole device interior passageway extending through the device, the downhole device producing a magnetic field;
   after the step of placing a downhole device into the wellbore,
   placing a magnetic-field protective shield apparatus into the downhole device interior passageway, the magnetic-field protective shield apparatus defining a shield apparatus passageway of a size to allow a downhole tool to pass longitudinally through the shield apparatus interior passageway, the shield apparatus buffering the magnetic field of the downhole device; and
   running a downhole tool through the magnetic-field protective shield apparatus interior passageway.

22. A method as in claim 21 wherein the step of placing the shield apparatus is simultaneous with the step of running the downhole tool.

23. A method as in claim 21 wherein operation of the downhole tool is adversely effected by magnetic fields.

24. A method as in claim 21 wherein the shield apparatus further comprises a mandrel on which a shield assembly is mounted, the shield assembly including at least two radially overlapping layers of material, one of the layers being a magnetic material and one of the layers being a non-magnetic material.

25. A method as in claim 24 wherein the shield assembly comprises at least three layers.

26. A method as in claim 25 wherein the shield assembly comprises a high magnetic permeability layer.

27. A method as in claim 24 wherein the shield assembly has at least two magnetic layers and at least two non-magnetic layers.

28. A method as in claim 27 wherein at least one layer is a high magnetic permeability layer.

29. A method as in claim 28 wherein the high magnetic permeability layer comprises at least a nickel-iron alloy.

30. A method as in claim 21 wherein the step of placing the downhole device in the wellbore is simultaneous with the step of placing the magnetic-field protective shield apparatus in the wellbore.

31. A method as in claim 21 further comprising the step of temporarily supporting the shield apparatus in the wellbore.

32. A method as in claim 31 further comprising the step of retrieving the shield apparatus from the wellbore.

33. A method as in claim 31 wherein the step of retrieving the shield apparatus includes using an internal fishing neck on the apparatus.

34. A method as in claim 21 wherein the downhole equipment comprises magnets.

35. A method as in claim 21 wherein the magnetic field intensity produced by the downhole device is greater than 0.02 Tesla, and wherein the shield apparatus, when in place inside the downhole device interior passageway, is operable to deflect the magnetic field produced by the downhole device exterior to the shield assembly, such that the magnetic field intensity inside the apparatus interior passageway is less than 0.001 Tesla.

36. A method as in claim 21 further comprising the step of retrieving the shield apparatus from the wellbore.

37. A method as in claim 21 wherein the step of placing a magnetic-field shield apparatus into the downhole device occurs after the step of placing the downhole device into the wellbore.

38. An apparatus as in claim 21 wherein the step of placing a magnetic-field shield apparatus into the downhole device occurs before the step of running a downhole tool through the shield apparatus interior passageway.

39. An apparatus as in claim 21 wherein the downhole device comprises a magnetic-field producing assembly having a longitudinal extent, and the magnetic-field shield assembly having a longitudinal extent at least the same of that of the magnetic-field producing assembly, such that the shield assembly when in place in the downhole device interior passageway is at least co-extensive with the magnetic-field producing assembly.

40. An apparatus as in claim 21 wherein the magnetic field is produced by the downhole device intermittently.

41. A method of using an apparatus in a subterranean well having a wellbore extending through a subterranean formation, the method comprising the steps of:

placing a downhole device defining an interior passageway therethrough into the wellbore; and then producing a magnetic field with the downhole device, thereby creating a magnetic field in the device interior passageway;

after the step of placing a downhole device into the wellbore, placing a magnetic-field protective shield apparatus into the interior passageway of the downhole device, the shield apparatus defining an interior passageway therethrough;

placing a downhole tool sensitive to magnetic fields into the interior passageway of the shield apparatus; thereby shielding the downhole tool from the magnetic field of the downhole device.

42. A method as in claim 41 wherein the step of placing the shield assembly is simultaneous with the step of placing the downhole tool into the well.

43. A method as in claim 41 wherein operation of the downhole tool is adversely effected by magnetic fields.

44. A method as in claim 41 wherein the step of producing a magnetic field includes creating a magnetic field intensity of between 0.02 and 0.10 Tesla.

45. A method as in claim 44 wherein the step of placing the a shield apparatus further comprises the step of damping the magnetic field such that the magnetic field intensity in the interior passageway of the shield apparatus is less than 0.001 Tesla.

46. A method as in claim 41 wherein the shield apparatus comprises at least three layers.

47. A method as in claim 46 wherein the shield apparatus comprises a high magnetic permeability layer.

48. A method as in claim 47 wherein the high magnetic permeability layer comprises at least a nickel-iron alloy.

49. A method as in claim 41 wherein the downhole device comprises magnets.

50. A method as in claim 41 wherein the step of producing a magnetic field is done intermittently.

51. A method as in claim 41 further comprising the step of retrieving the shield apparatus.

52. A method as in claim 41 wherein the downhole tool is adversely affected by the magnetic field produced by the downhole device.

53. A method as in claim 52 wherein the downhole device comprises magnets.

54. A method as in claim 52 further comprising the step of retrieving the shield apparatus.

55. A method as in claim 54 further comprising the step of operating the downhole device.

56. A method as in claim 54 further comprising operating the downhole tool.

57. A method as in claim 54 further comprising retrieving the downhole tool.

58. A method as in claim 52 wherein the shield apparatus is removably attachable to the downhole device.

59. A method as in claim 52 wherein the downhole device is a magnetically operated device.

60. A method as in claim 52 further comprising the step of operating the downhole device.

61. A method as in claim 52 further comprising operating the downhole tool.

62. A method as in claim 52 further comprising retrieving the downhole tool.

63. A method as in claim 41 wherein the downhole device is a magnetically operated device.

64. A method as in claim 41 further comprising the step of operating the downhole device.

65. A method as in claim 41 further comprising operating the downhole tool.

66. A method as in claim 41 further comprising retrieving the downhole tool.

67. A method as in claim 41 further comprising the step of temporarily supporting the shield apparatus in the wellbore.

* * * * *